United States Patent Office 3,483,939
Patented Dec. 16, 1969

3,483,939
SKIRT FOR PLENUM-TYPE AIR CUSHION VEHICLE
Owen Richard Maddock and Frederick George Cross, Cowes, Isle of Wight, England, assignors to Cross and Jackson Limited, Cowes, Isle of Wight, England, a British company
Filed Mar. 10 1967, Ser. No. 622,282
Claims priority, application Great Britain, Mar. 11, 1966, 10,696/66
Int. Cl. B60v 1/16
U.S. Cl. 180—127                                    6 Claims

ABSTRACT OF THE DISCLOSURE

A skirt for a plenum-type air cushion vehicle which consists of a flexible skirt material and a series of booms movably attached to the periphery of the vehicle and the lower portion of the skirt material.

---

The invention is a peripheral flexible skirt for plenum type air cushion vehicles. The skirt has a "C" or "(" cross-section of which the top edge is fixed and air-sealed to the bottom edge has booms attached at intervals along its bottom peripheral edge which permit skirt movement. The skirt material may be of any material giving the required flexibility, e.g. canvas, "terylene" etc. so long as salt water is not deleterious thereto.

Most skirts for air cushion vehicles use are designed for peripheral jet machines and are built up as inflatable double walled structures. Those for plenum type machines are also designed as inflatable structures and generally requires an air bleed to inflate them. Skirts that are not inflatable, i.e. simple curtain skirts, require stabilizing cords or ties and even then give rise to vertical stability problems.

The object of this invention is to stabilize a simple curtain skirt with a boom free to move in at least two directions.

The invention is directed to a plenum-type air cushion vehicle skirt comprising flexible skirt material adapted to be outwardly convex when air is pressured into the plenum and extending about the periphery of the body of the vehicle, a series of booms periodically spaced along the skirt material, means attaching one end of each boom to the bottom portion of the skirt material and further means rotatably attaching the other end of each boom to the body of the vehicle so that when a boom of at least the side skirts is deflected upwards, the resultant tensioning in the skirt material will tend to return such boom to its undeflected position, the boom being hinged to the body of the vehicle and the axis of the hinge is approximately 30° down from the horizontal when viewing in elevation and approximately 30° inwardly and forwardly when viewing in plan.

These booms, along the sides and back of the vehicle, can splay out so that the bottom of the skirt is further out than the top, thus permitting the air cushion area to be equal to or greater than the whole plan area of the vehicle.

Along the front edge of the vehicle, the booms can incline inward so that at the bottom of the skirt is further back than the top to allow it to deflect upwards and backwards when encountering an obstacle.

The amount of splay, or inclination, of all booms may be controlled by flexible ties from points near their bottom ends to points on the underside of the vehicle's solid structure inboard from their top ends. The cushion pressure acting on the skirt will keep these ties in tension.

Figure 1:
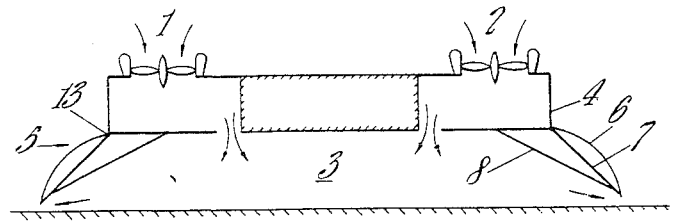
Figure 2:
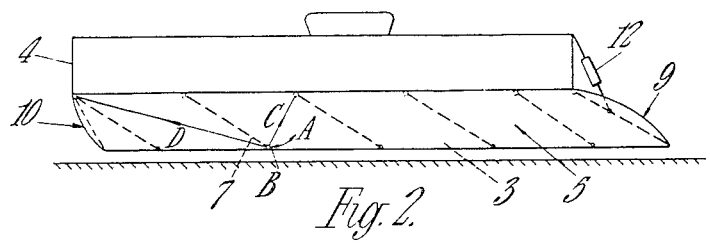
Figure 3A:
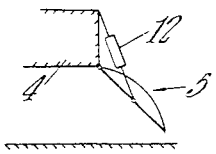
Figure 3B:
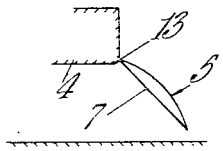
Figure 4:
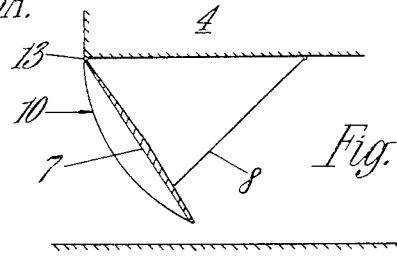
Figure 5A:
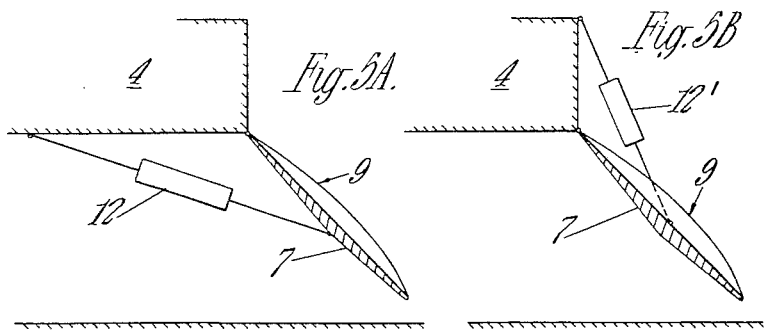
Figure 5B:
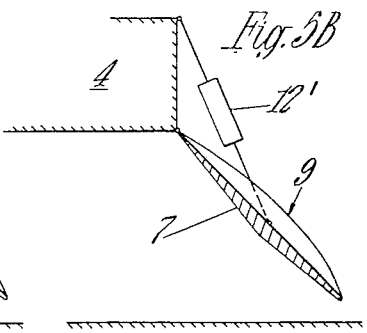
Figure 6:
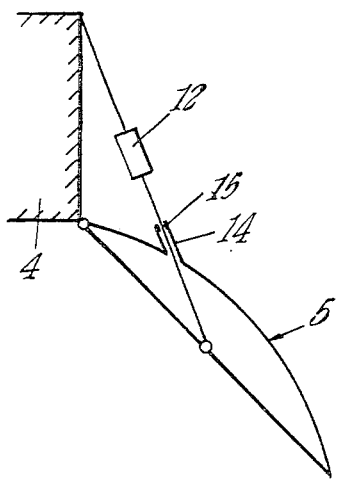
Figure 7A:
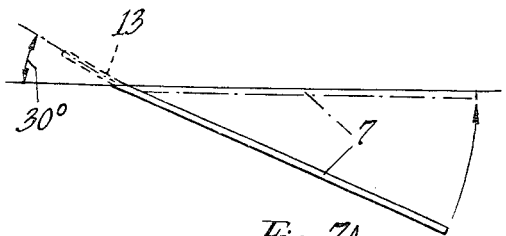
Figure 7B:
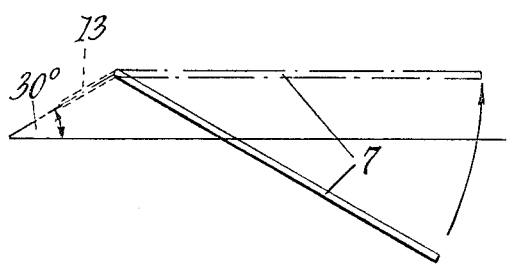
Figure 8:
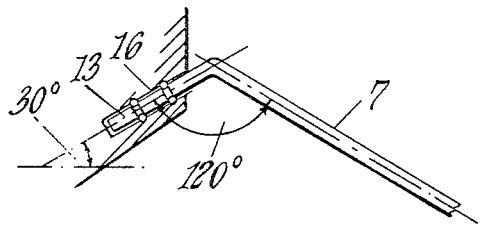
Figure 9:
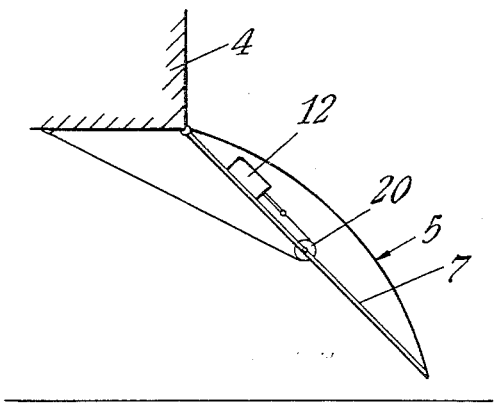

The invention will now be explained by referring to the exemplary embodiments illustrated on the accompanying drawings, in which:

FIGURE 1 is a front diagrammatic elevational view of a multifan plenum-type air cushion vehicle;
FIGURE 2 is a side elevational view of the vehicle shown in FIGURE 1;
FIGURES 3A and 3B are partial diagrammatic elevations showing two alternative arrangements for the side skirts;
FIGURE 4 is an enlarged partial side diagrammatic view showing the arrangement of the forward skirt;
FIGURE 5A and 5B are two enlarged partial side diagrammatic views showing possible arrangements of the aft skirts;
FIGURE 6 is a partial side diagrammatic view of the FIG. 3A embodiment illustrating the manner in which the struts extend through the skirts;
FIGURES 7A and 7B are plan and elevational views of the hinge illustrated in FIG. 3B;
FIGURE 8 is a detailed view of a mounting for the hinge; and
FIGURE 9 is a partial side diagrammatic view of a further embodiment.

FIGURE 1 of the accompanying drawings shows a typical multifan plenum type vehicle having two intake fans 1, 2 which draw the air from the outside into a plenum 3 and it escapes under the skirts (as shown by arrows). A body 4 of the vehicle has side skirts 5 depending from its lower periphery. The side skirts are defined by flexible skirt material 6 which assumes a concavo-convex shape due to the plenum air, rigid booms 7 which are movably attached to the body 4 and attached to the lower portion of the skirt material 6, and ties 8. The ties are of flexible wire or rope and are attached from the bottom ends of the booms 7 to the underside of the body 4. These ties 8 limit the extent to which the side skirts 5 can be outwardly moved due to the air pressured of the plenum air cushion.

Turning now to FIGURE 2, it is seen that aft skirt extends outwards (see FIGURES 5A or B) from the plenum 3 and forward skirt 10 extends inward (see FIGURE 4).

Along the sides of the vehicle the booms 7 of the side skirts 5 are inclined so that their bottom ends are further back than their top ends to allow the section of skirt they control to deflect upwards and backwards when encountering an obstacle. Also, a line through the top point of a boom and the top point of its tie can be inclined relative to the top of the boom either in the plan view or the front view, or both, so that the section of skirt it controls deflects inwards as well as upwards and backwards to allow for the vehicle encountering an obstacle when its direction of travel is not the direction in which it is pointing.

The side skirt 5 of FIGURE 2 has a cross section as seen in FIGURE 1. Each one of the booms 7 can act independent of the adjacent booms and when boom 7 is deflected by an obstacle in the direction of arrow A the radius of the skirt material to the right of boom 7 in FIGURE 2 is decreased and the tension is lessened. In contradistinction, the radius of the skirt material to the left of boom 7 is increased along with the tension. That is to say the tension indicated by arrow D is in excess of the tension indicated by arrow C and there is a correcting force to return the deflected boom 7 to its equilibrium position. This is an important feature of the side skirts and it is possible for the aft skirt 9 or even the front skirt 10 to have the same correcting force if the vehicle is travelling askew its forward axis when the skirts hit an obstacle.

Instead of having ties 8 to limit the extent of outward deflection of side skirts 5, they may have spring struts 12 (see FIGURE 3A). Each strut is connected to the boom at about its mid-point and to the outside top part of the vehicle body 4. The spring struts 12 allows the side skirts to move outwards and backwards. As shown in FIGURE 6, the strut 12 extends through a sleeve 14 provided with a seal 15 attached to or integral with the skirt 5. It should be mentioned that a similar arrangement may be employed in connection with a skirt 9.

An alternative arrangement for the side boom is shown in FIGURE 3B. In this embodiment there is no tie 8 or spring strut 12 to limit the outward movement of the skirt and contain the plenum air. Instead, the boom 7 hinges at 13 to the vehicle body 4 and due to the angle the axis of the hinge makes with the plane of the undersurface of the body 4, no restraints are required. The axis of the hinge for each boom is approximately 30° down from the horizontal when viewing in elevation, and approximately 30° inwardly and forwardly when viewing in plan. This means that the horizontal force vector exerted by the plenum air on the concave inner surface of the skirt material tends to move the boom outward, and to move outward it must go forward. On the other hand, the vertical force vector tends to move the boom upwards and backwards. An equilibrium may be achieved for each dimension skirt and the forces exerted by the plenum air pressure are utilized to contain the plenum air.

FIGURES 7A and 7B are plan and elevational views of the hinge 13 and it can be seen that the angle between the hinge 13 and the boom 7 is substantially of 120° but since the boom disclosed in FIGURE 3B goes into the plane of the paper, this angle appears less than 120° in such figure.

With reference to FIGURE 8, it will be noted that the hinge 13 can be mounted in a sleeve-type gasket 16 and this figure is a view taken through the plane of the hinge 13 and the boom 7.

FIGURE 4 shows the front skirt 10 and the flexible tie 8. The tie limits the outward movement of the skirt, and it is preferably always inclined inwardly. If the front skirt encounters an obstacle, the skirt material and boom 7 will deflect inwardly and the tie 8 will go slack.

The aft skirt 9 is shown in FIGURES 5A and 5B. The embodiment in FIGURE 5B utilizes a spring strut 12 and the strut is placed as it was in the side skirt embodiment of FIGURE 3A. The embodiment shown in FIGURE 5A also uses a spring strut 12 but places it in the plenum chamber rather than outside. Another distinction is that the spring strut of FIGURE 5A must give in tension so as to allow the skirt to deflect outwards, and the spring strut of FIGURE 5B must give in compression. In either case the spring will be of sufficient strength to balance the air cushion pressure on the skirt.

Due to the fact that the springs or hydraulic cylinders will be more easily fouled if in the plenum chamber as in FIGURE 5A, it is possible as illustrated in FIGURE 9 to only have a cable or rope in the plenum chamber which passes around a pulley 20 in the boom 7 and attaches like FIGURE 5B to the outside of the vehicle body 4.

Still a further alternative would be to make the booms telescopically collapsible to act as a shock absorber if an obstacle is hit in the axial direction of the boom.

What we claim is:

1. The combination with an air cushion vehicle having a body, of a plenum-type vehicle skirt, said skirt comprising a flexible skirt material adapted to be outwardly convex when air is pressured into the plenum and extending around the periphery of the body of the vehicle, and a series of booms periodically spaced along the skirt material, means attaching one end of each boom to the bottom portion of the skirt material and further means rotatably attaching the other end of each boom to the body of the vehicle so that when a boom of at least the side skirts is deflected upwards, the resultant tensioning in the skirt material will tend to return such boom to its undeflected position, the boom being hinged to the body of the vehicle and the axis of the hinge is approximately 30° down from the horizontal when viewing in elevation and approximately 30° inwardly and forwardly when viewing in plan.

2. The skirt as claimed in claim 1 further comprising tie means attached to each boom and to the body of the vehicle within the plenum chamber, with said tie means limiting the outward deflection of the skirts.

3. The skirt as claimed in claim 2 wherein the tie means are flexible wire or rope.

4. The skirt as claimed in claim 2 wherein the tie means are hydraulic struts.

5. The skirt as claimed in claim 1 further comprising hydraulic struts attached to each boom and the outside of the body of the vehicle.

6. The skirt as claimed in claim 1 wherein in a side elevation of the vehicle the booms define an acute angle with the body of the vehicle in the aft direction while in their equilibrium condition.

References Cited

UNITED STATES PATENTS

| 3,249,166 | 5/1966 | Cockerell et al. | 180—128 |
| 3,273,663 | 9/1966 | Cockerell | 180—127 X |
| 3,321,039 | 5/1967 | Watts | 180—127 |
| 3,373,839 | 3/1968 | Hardy et al. | 180—128 |
| 3,291,240 | 12/1966 | Driver | 180—128 |

A. HARRY LEVY, Primary Examiner